(12) United States Patent
Neet et al.

(10) Patent No.: US 8,106,559 B2
(45) Date of Patent: Jan. 31, 2012

(54) COMPONENT FOR AN ELECTRIC MACHINE

(75) Inventors: Kirk Neet, Pendleton, IN (US); Scott Bitzer, Fishers, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 0 days.

(21) Appl. No.: 12/906,561

(22) Filed: Oct. 18, 2010

(65) Prior Publication Data

US 2011/0031842 A1     Feb. 10, 2011

Related U.S. Application Data

(62) Division of application No. 12/177,237, filed on Jul. 22, 2008.

(51) Int. Cl.
*H02K 3/32* (2006.01)
(52) U.S. Cl. .................. 310/194; 310/195; 310/263
(58) Field of Classification Search .......... 310/194–195, 310/263
See application file for complete search history.

(56) References Cited

U.S. PATENT DOCUMENTS

| | | | |
|---|---|---|---|
| 5,539,265 A * | 7/1996 | Harris et al. | 310/263 |
| 5,973,423 A * | 10/1999 | Hazelton et al. | 310/12.02 |
| 6,777,845 B2 * | 8/2004 | York et al. | 310/194 |
| 6,888,271 B2 * | 5/2005 | York | 310/49.32 |
| 7,038,347 B2 * | 5/2006 | Militello et al. | 310/194 |

FOREIGN PATENT DOCUMENTS

FR      2616280 A1 * 12/1988

OTHER PUBLICATIONS

FR 2616280 A1 machine translation on May 31, 2011.*

* cited by examiner

*Primary Examiner* — Quyen Leung
*Assistant Examiner* — Leda Pham
(74) *Attorney, Agent, or Firm* — Cantor Colburn LLP

(57) ABSTRACT

A component for an electric machine includes a spool having a main body portion provided with a first end portion that extends substantially uninterrupted to a second end portion through an intermediate portion. A plurality of mounting elements are provided on the first end portion. A star member is operatively connected to the spool. The star member includes a main body, a plurality of flap members that extend from the main body and collectively define a central opening, and a plurality of mounting members that extend into the central opening. The plurality of mounting members engage with corresponding ones of the plurality of mounting elements to detachably mount the star member to the first end portion of the spool.

17 Claims, 6 Drawing Sheets

COMPONENT FOR AN ELECTRIC MACHINE

CROSS REFERENCE TO RELATED APPLICATIONS

This application is a divisional application of U.S. patent application Ser. No. 12/177,237 filed Jul. 22, 2008, the contents of which are incorporated by reference herein in their entirety.

BACKGROUND OF THE INVENTION

Exemplary embodiments of the invention relate to the art of electric machines and, more particularly, to a spool assembly for an electric machine.

Certain electric machines, such as claw-pole alternators, include a rotor formed from a plurality of steel segments, a steel core, magnet wire, and a spool assembly. The spool assembly includes a spool configured to insulate the magnet wire from the steel core, and flaps that are configured to insulate the magnet wire from the steel segments. Prior art spools were formed completely from plastic. The plastic spools were bulky which limited carrying capacity for the magnet wire.

Newer spool assemblies employ a plastic spool, indicated generally at 2 in FIG. 1, and laminate flaps (not shown) formed in a star. The laminate flaps or stars allowed for a spool assembly that was much thinner than the prior art plastic spool assemblies. The thinner design increased carrying capacity for the magnet wire and heat transfer from the spool assembly. While the newer spool assemblies have several advantages over the older completely plastic designs, a disadvantage exists in that the laminate flaps are attached to spool 2 by sonic welding. Not only is sonic welding a difficult and expensive process, sonic welding also requires that spool 2 include thick plastic portions in the form of opposing thick flanges 4 and 5 that provide weld support surfaces, one of which is indicated at 8. The thick plastic portions or thick flanges 4 and 5 defeat the purpose of the new design. That is, by adding thick flanges 4 and 5 to spool 2, magnet wire carrying capacity is reduced.

BRIEF DESCRIPTION OF THE INVENTION

In accordance with an exemplary embodiment of the invention, a component for an electric machine includes a spool having a main body portion provided with a first end portion that extends substantially uninterrupted to a second end portion through an intermediate portion. A plurality of mounting elements are provided on the first end portion. A star member is operatively connected to the spool. The star member includes a main body, a plurality of flap members that extend from the main body and collectively define a central opening, and a plurality of mounting members that extend into the central opening. The plurality of mounting members engage with corresponding ones of the plurality of mounting elements to detachably mount the star member to the first end portion of the spool.

In accordance with another exemplary embodiment, a star member for an electric machine includes a main body, a plurality of flap members that extend from the main body and collectively define a central opening, and a plurality of mounting members that extend into the central opening.

Additional features and advantages are realized through the techniques of exemplary embodiments of the present invention. Other embodiments and aspects of the invention are described in detail herein and are considered a part of the claimed invention. For a better understanding of the invention with advantages and features thereof, refer to the description and to the drawings.

DETAILED DESCRIPTION OF THE INVENTION

Figure 1:
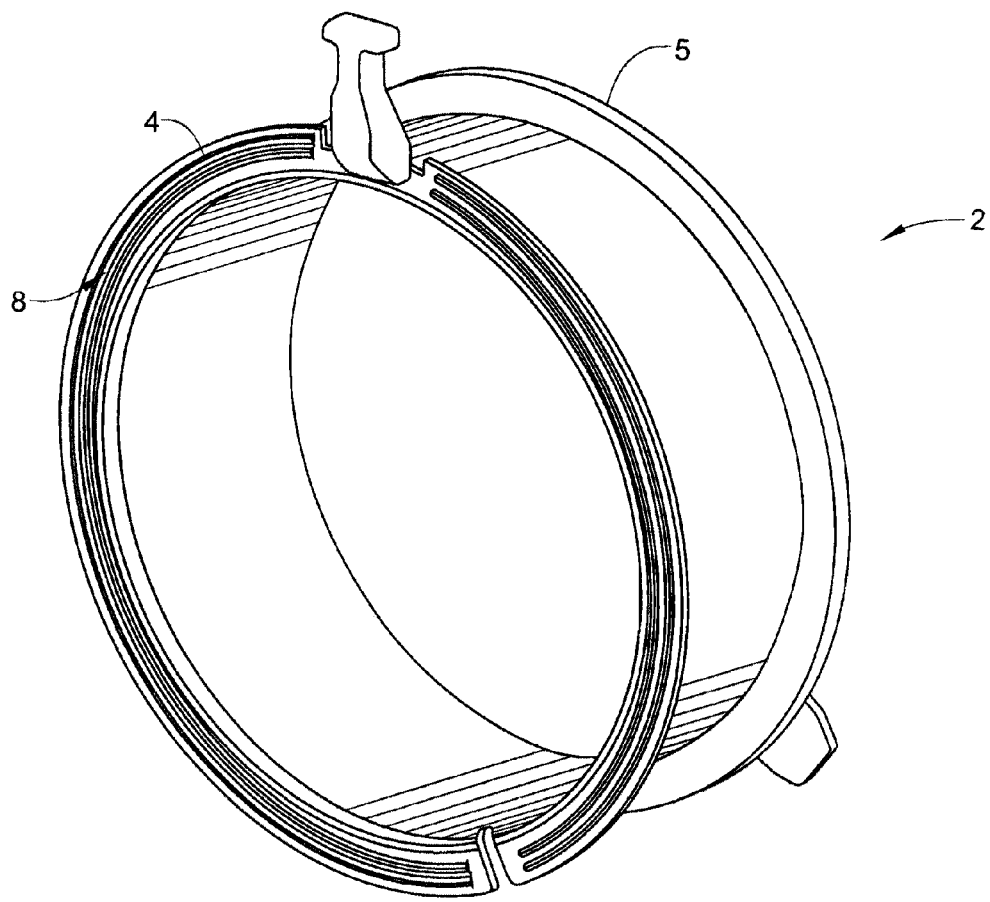
FIG. 1 is a right perspective view of a spool for an electric machine constructed in accordance with the prior art.
Figure 2:
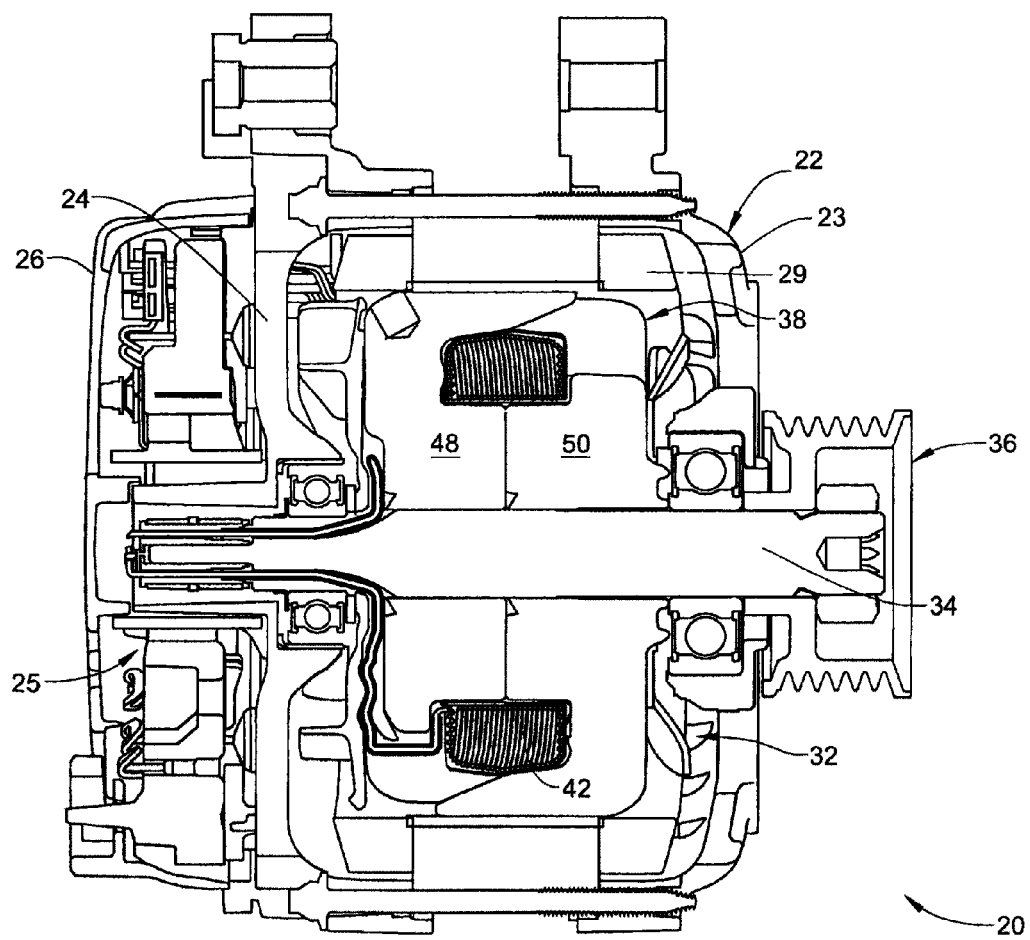
FIG. 2 is a cross-sectional side view of an electric machine including a spool assembly constructed in accordance with an exemplary embodiment of the invention.
Figure 3:
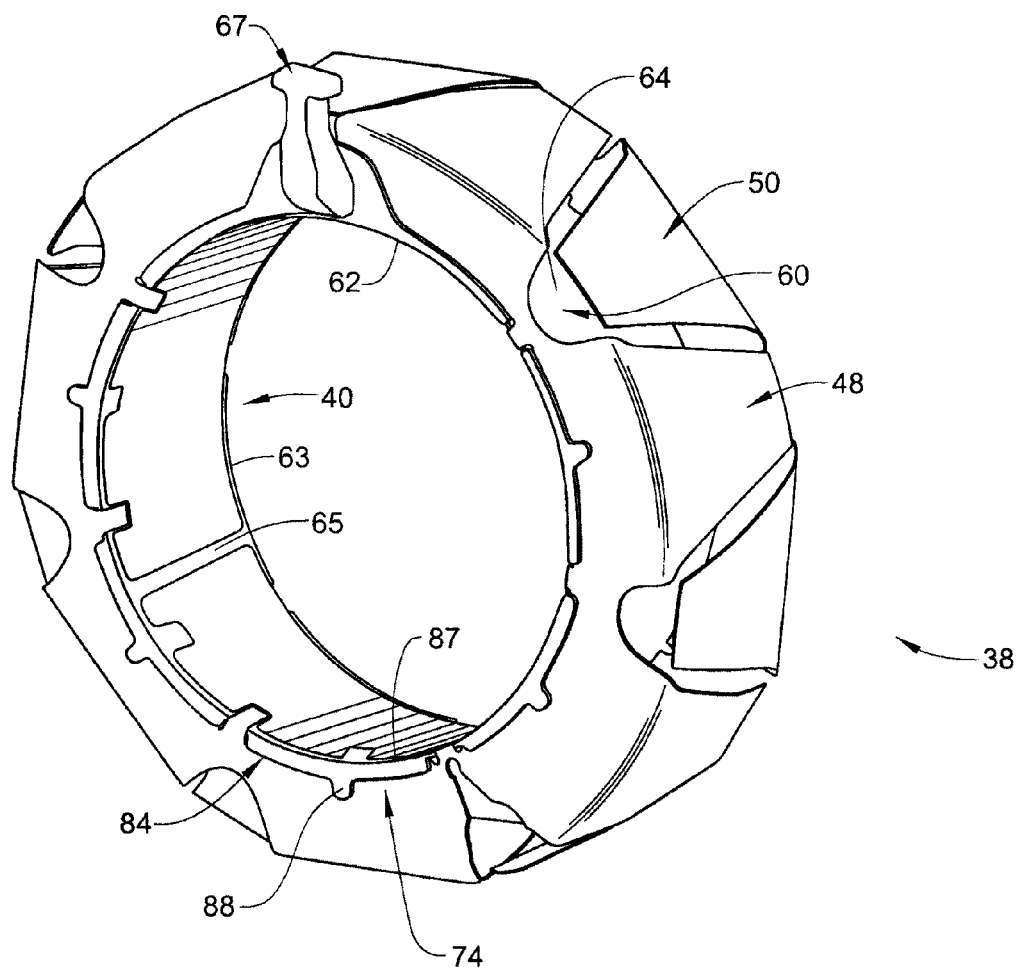
FIG. 3 is a right perspective view of a spool assembly in accordance with an exemplary embodiment of the invention.

With initial reference to FIGS. 2 and 3, an electric machine, shown in the form of an automotive alternator, constructed in accordance with exemplary embodiments of the invention is indicated generally at 20. Electric machine 20 includes a housing 22 having a first surface 23 and a second, opposing surface 24. A plurality of electrical components 25 are mounted to second surface 24 and are provided with a cover 26. In addition, electric machine 20 is shown to include a stator 29 having a plurality of steel segments (not separately labeled) and a rotor 32. Rotor 32 includes a shaft 34 operatively coupled to a pulley 36, and a spool assembly 38. As will be detailed more fully below, spool assembly 38 includes a spool 40 wrapped with wire 42 and protected by first and second star members 48 and 50. In accordance with one aspect of the exemplary embodiment, spool 40 is formed from a non-electrically conducting material, such as nylon, and each star member is formed from a non-conducting sheet of insulation material or laminate. Typically, each star member 48 and 50 is stamped or rolled out of the non-conducting sheet or laminate. In operation, rotor 32 spins within housing 22 adjacent to stator 29. The motion of rotor 32 causes an electrical current to develop in wire 42. The electrical current is passed to electrical components 25 for processing. The processed electrical current is then utilized to power various electrical devices.

Reference will now be made to FIGS. 3-6 in describing spool assembly 38 constructed in accordance with exemplary embodiments of the invention. As shown, star members 48 and 50 are mounted to spool 40 and manipulated (folded) to provide protection for underlying wire (not shown). In accordance with one aspect of the exemplary embodiment, spool 40 is formed from a readily moldable and electrically insulating material such as, but not limited to, plastic. Towards that end, spool 40 includes a main body portion 60 having a first peripheral end portion 62 that extends to a second peripheral end portion 63 through a substantially un-interrupted intermediate portion 65. That is, spool 40 is constructed without thick flanges in order to maximize wire carrying capacity of spool assembly 38. Spool 40 is also shown to include a wire tie off post 67 as well as a first plurality of mounting elements, one of which is indicated at 74, and a second plurality of mounting elements, one of which is indicated at 76, for retaining star member 48. Spool 40 also includes a third plurality of mounting elements, one of which is indicated a 80, and a fourth plurality of mounting elements, one of which is indicated at 82, for retaining star member 50.

Figure 4:
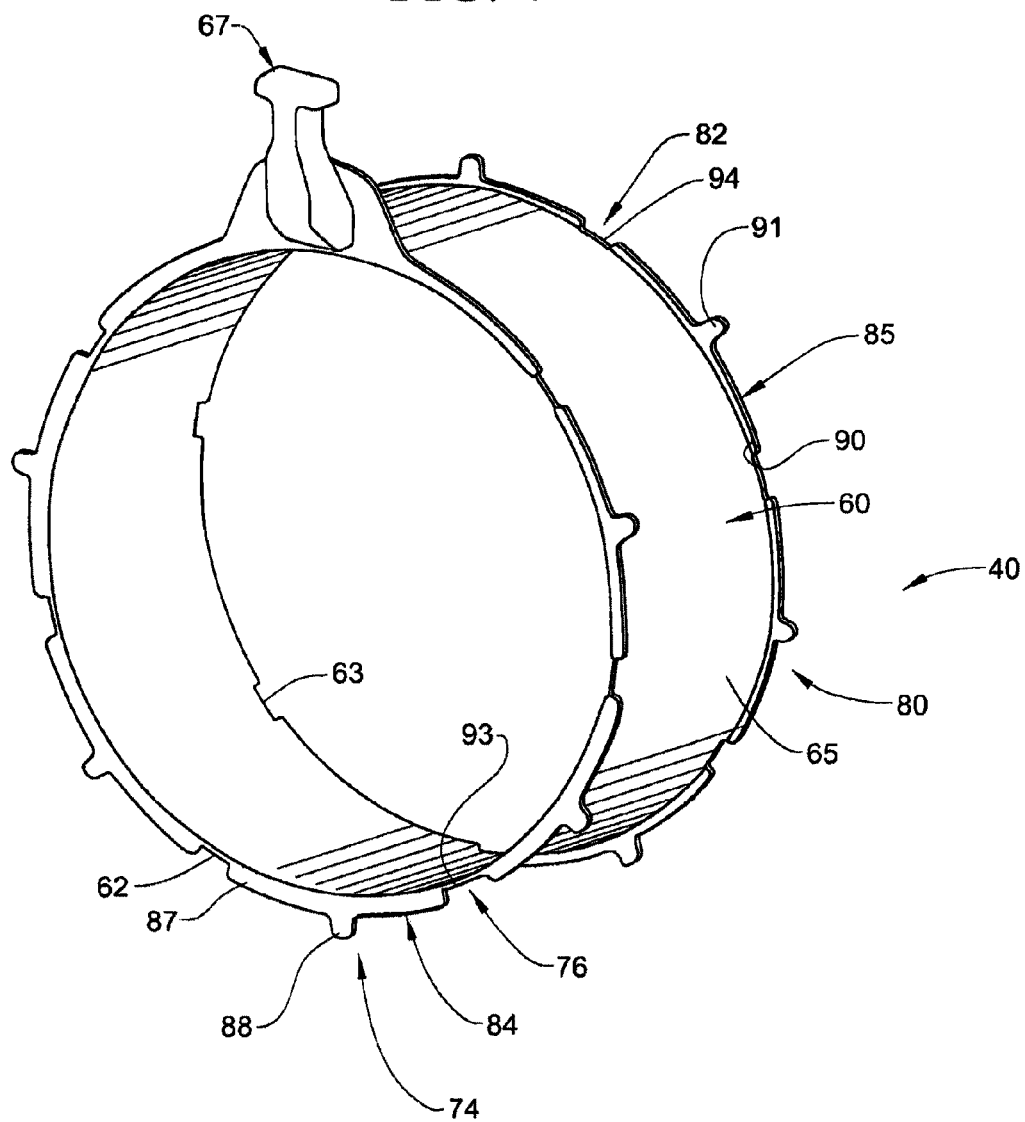
FIG. 4 is a right perspective view of a spool portion of the spool assembly of FIG. 3.

As best shown in FIG. 4, each of the first and third pluralities of mounting elements 74 and 80 take the form of a projection, such as shown at 84 in connection with mounting elements 74, and at 85 in connection with mounting elements 80. Each projection 84 and 85 extends substantially perpendicularly outward from respective ones of first and second end portions 62 and 63 and is arranged in a spaced relationship about main body portion 60. In addition, projection 84 includes an ear element 87 and a tab element 88. Likewise, projection 85 includes an ear element 90 and tab element 91. Also shown in FIG. 4, each of the second and fourth plurality of mounting elements 76 and 82 take the form of slots, such as shown at 93 in connection with second plurality of mounting element 76, and at 94 in connection with fourth plurality of mounting element 82. Each slot 93 and 94 is arranged in a spaced relationship about respective ones of first and second end portions 62 and 63. More specifically, projections 84 and slots 93 are staggered about first end portion 62 while projections 85 and slots 94 are staggered about second end portion 63. By staggered it should be understood that, for example, projection 84 and slot 93 are arranged in an alternating pattern one after the other about a periphery of first end portion 62.

Figure 5:
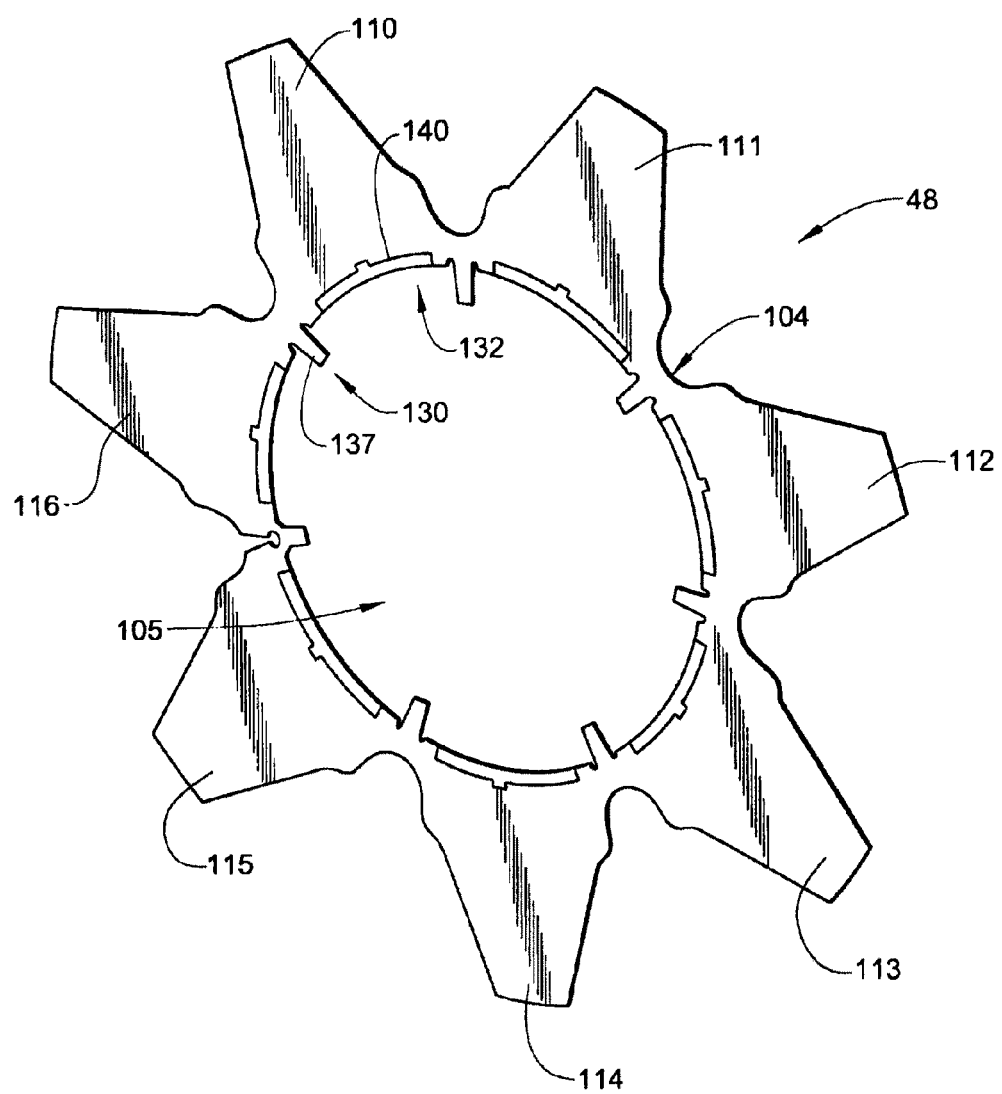
FIG. 5 is a right perspective view of a star member of the spool assembly of FIG. 3.

At this point it should be understood that each star member 48 and 50 is similarly formed such that a detailed description will follow referencing FIG. 5 in describing star member 48 with an understanding that star member 50 includes corresponding structure. As shown, star member 48 is formed from a laminate material such as, but not limited to, a Polyester/meta-aramid or Nomex®/Polyester, or Polyimide/meta-aramid or Nomex®/Polyimide or the like. Star member 48 includes a main body 104 having a central opening 105. Star member 48 includes a plurality of flap members 110-116 that radiate outward from a central opening 105 and a plurality of mounting members, one of which is indicated at 130, and a plurality of mounting components, one of which is indicated at 132. Each of the plurality of mounting members 130 takes the form of a prong 137 that extends radially into central opening 105 while each of the plurality of mounting components 132 takes the form of a recess 140 formed in main body 104.

Figure 6:
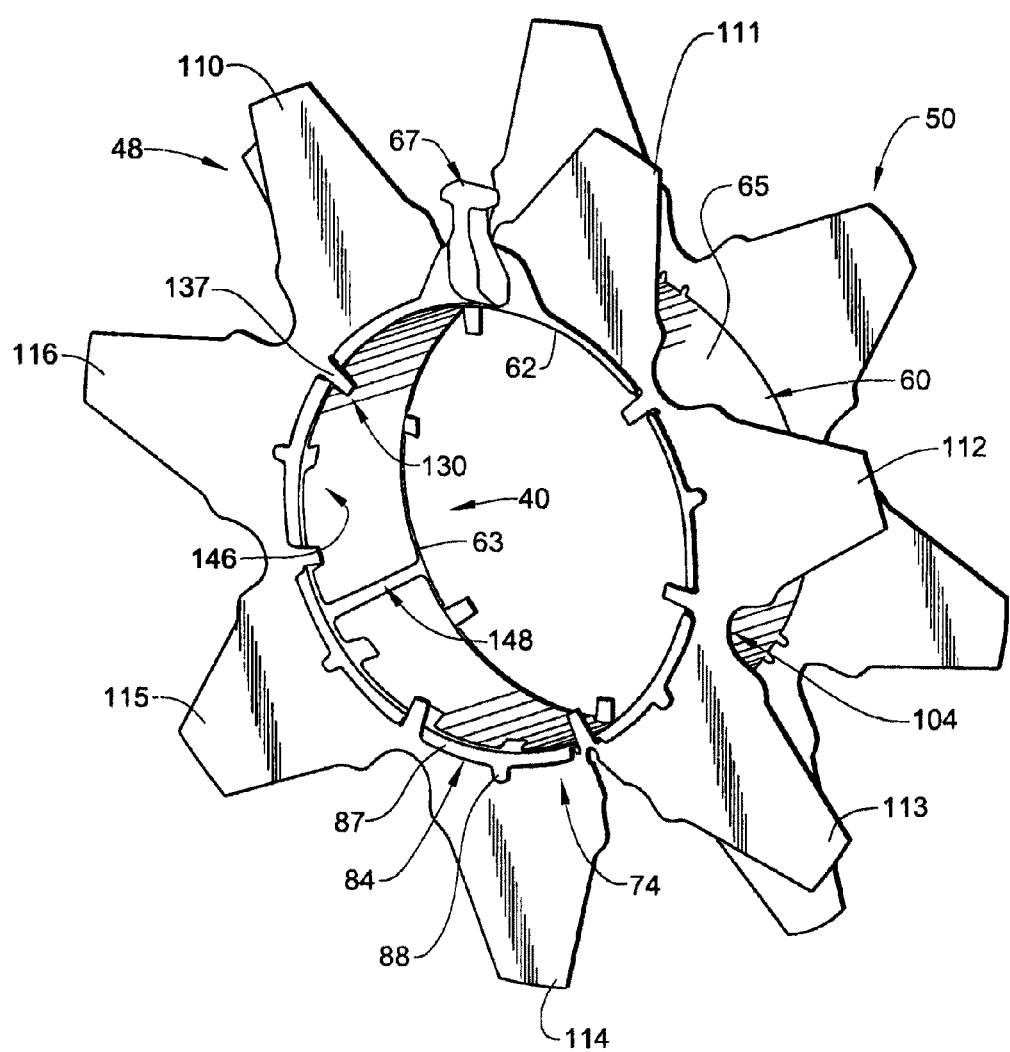
FIG. 6 is a right perspective view of the star member of FIG. 5 mounted to the spool of FIG. 4.

Reference will now be made to FIG. 6 in describing an exemplary construction of spool assembly 38. As shown, each star member 48 and 50 is mounted to corresponding ones of first and second end portions 62 and 63 of spool 40. Star member 48 is oriented such that each of the plurality of prongs 137 registers with a corresponding one of the second plurality of mounting elements 76. In this manner, each of the plurality of recesses 140 registers with a corresponding one of the first plurality of mounting elements 74. First plurality of mounting elements 74 prevent star member 48 from being moved in a direction away from second end portion 63, and second plurality of mounting elements 76 prevent star member 48 from moving in a direction toward second end portion 63.

More specifically, when star member 48 is properly positioned, each of the first plurality of mounting members 74 nests within a corresponding recess 140. With this construction, ear elements 87 and tab elements 80 not only contribute to establishing a desired orientation but also prevent any axial/rotational movement of star member 48 relative to a central axis (not separately labeled) of spool 40. Similarly, star member 50 is secured to spool 40 by third pluralities of mounting elements 80 and a fourth plurality of mounting elements 82.

Once star members 48 and 50 are properly positioned, prongs 137 on star member 50 are folded over into an interior surface (not separately labeled) of spool 40. More specifically, a steel ring 146 is inserted into spool 40 folding and locking prongs 137 to slots 93. Prongs 137 prevent rotation of star member 48 relative to spool 40. Steel ring 146 includes a split 148 that ensures a tight engagement with spool 40. After star members 48 and 50 are locked in position, spool 40 is wrapped with wire. After wrapping with wire, spool assembly 38 is inserted onto a rotor segment core (not separately labeled). Segment fingers (not shown) on the segment core cause flaps 110-116 on each star member 48 and 50 to fold over. The segment fingers also cause prongs 137 on star member 48 to fold over into corresponding slots (not separately labeled) formed in steel ring 146 to complete spool assembly 38 such as shown in FIG. 3.

At this point it should be understood that the above exemplary embodiments provide a spool assembly and components of a spool assembly having an enhanced wire carrying capacity while simultaneously eliminating the need for costly and difficult welding operations. That is, by eliminating the large, thick flanges required on prior art spools, the spool, in accordance with the exemplary embodiment, holds a larger volume of wire without increasing in size.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. A component for an electric machine comprising:
a spool including a main body portion including a first end portion that extends substantially uninterrupted to a second end portion through an intermediate portion, a plurality of mounting elements provided on the first end portion, the plurality of mounting elements comprising projections that extend radially outward from the main body portion at the first end portion; and
a star member operatively connected to the spool, the star member including a main body, a plurality of flap members that extend from the main body and collectively define a central opening; and a plurality of mounting members that extend into the central opening, the plurality of mounting members engaging with corresponding ones of the plurality of mounting elements to detachably mount the star member to the first end portion of the spool.

2. The component according to claim 1, further comprising: another plurality of mounting elements provided on the second end portion of the spool.

3. The component according to claim 2, further comprising: another star member mounted to the second end portion of the spool.

4. The component according to claim 1, wherein each of the plurality of projections includes an ear element and a tab element.

5. The component according to claim 1, further comprising: a steel ring positioned on an inner surface of the main body portion.

6. The component according to claim 1, wherein the star member is formed from a malleable material.

7. The component according to claim 6, wherein the star member is formed from a laminate material.

8. The component according to claim 7, wherein the laminate material includes one of a polyester, meta-aramid, polyester laminate.

9. The component according to claim 7, wherein the laminate material includes one of a polyimide, meta-aramid, polyimide laminate.

10. A star member for an electric machine, the star member comprising:
   a main body,
   a plurality of flap members that extend from the main body and collectively define a central opening;
   a plurality of mounting members that extend into the central opening; and
   a plurality of mounting components each comprising a recess formed in the main body, each of the plurality of mounting components being arranged adjacent respective ones of the plurality of mounting members.

11. The star member according to claim 10, wherein each of the plurality of mounting members comprises a prong that extends radially into the central opening.

12. The star member according to claim 10, wherein the star member is formed from a non-conducting material laminate.

13. The star member according to claim 10, further comprising a spool operatively connected to the plurality of mounting members.

14. The star member according to claim 10, wherein the star member is formed from a malleable material.

15. The star member according to claim 14, wherein the star member is formed from a laminate material.

16. The star member according to claim 15, wherein the laminate material includes one of a polyester, meta-aramid, polyester laminate.

17. The star member according to claim 15, wherein the laminate material includes one of a polyimide, meta-aramid, polyimide laminate.

* * * * *